United States Patent
Blumrich et al.

(10) Patent No.: US 7,827,391 B2
(45) Date of Patent: Nov. 2, 2010

(54) METHOD AND APPARATUS FOR SINGLE-STEPPING COHERENCE EVENTS IN A MULTIPROCESSOR SYSTEM UNDER SOFTWARE CONTROL

(75) Inventors: Matthias A. Blumrich, Ridgefield, CT (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 11/768,857

(22) Filed: Jun. 26, 2007

(65) Prior Publication Data

US 2009/0007119 A1   Jan. 1, 2009

(51) Int. Cl.
*G06F 9/00* (2006.01)

(52) U.S. Cl. .................... 712/227; 718/108; 711/141
(58) Field of Classification Search ................. 712/227; 718/108

See application file for complete search history.

(56) References Cited

U.S. PATENT DOCUMENTS

| | | | |
|---|---|---|---|
| 4,777,595 A | 10/1988 | Strecker et al. |
| 5,063,562 A | 11/1991 | Barzilai et al. |
| 5,142,422 A | 8/1992 | Zook et al. |
| 5,349,587 A | 9/1994 | Nadeau-Dostie et al. |
| 5,353,412 A | 10/1994 | Douglas et al. |
| 5,452,432 A | 9/1995 | Macachor |
| 5,524,220 A | 6/1996 | Verma et al. |
| 5,634,007 A | 5/1997 | Calta et al. |
| 5,659,710 A * | 8/1997 | Sherman et al. ............. 711/146 |
| 5,708,779 A | 1/1998 | Graziano et al. |
| 5,748,613 A | 5/1998 | Kilk et al. |
| 5,761,464 A | 6/1998 | Hopkins |
| 5,796,735 A | 8/1998 | Miller et al. |
| 5,809,278 A | 9/1998 | Watanabe et al. |
| 5,825,748 A | 10/1998 | Barleu et al. |
| 5,890,211 A | 3/1999 | Sokolov et al. |
| 5,917,828 A | 6/1999 | Thompson |
| 6,023,732 A | 2/2000 | Moh et al. |
| 6,061,511 A | 5/2000 | Marantz et al. |
| 6,072,781 A | 6/2000 | Feeney et al. |
| 6,122,715 A | 9/2000 | Palanca et al. |
| 6,185,214 B1 | 2/2001 | Schwartz et al. |
| 6,219,300 B1 | 4/2001 | Tamaki |

(Continued)

OTHER PUBLICATIONS

David Chaiken , Craig Fields , Kiyoshi Kurihara , Anant Agarwal, Directory-Based Cache Coherence in Large-Scale Multiprocessors, Computer, v.23 n.6, p. 49-58, Jun. 1990.*

(Continued)

*Primary Examiner*—Eddie P Chan
*Assistant Examiner*—Idriss N Alrobaye
(74) *Attorney, Agent, or Firm*—Scully, Scott, Murphy & Presser, P.C.; Daniel P. Morris, Esq.

(57) ABSTRACT

An apparatus and method are disclosed for single-stepping coherence events in a multiprocessor system under software control in order to monitor the behavior of a memory coherence mechanism. Single-stepping coherence events in a multiprocessor system is made possible by adding one or more step registers. By accessing these step registers, one or more coherence requests are processed by the multiprocessor system. The step registers determine if the snoop unit will operate by proceeding in a normal execution mode, or operate in a single-step mode.

17 Claims, 5 Drawing Sheets

U.S. PATENT DOCUMENTS

| | | | |
|---|---|---|---|
| 6,263,397 | B1 | 7/2001 | Wu et al. |
| 6,295,477 | B1* | 9/2001 | Belhazy ..................... 700/5 |
| 6,295,571 | B1 | 9/2001 | Scardamalia et al. |
| 6,311,249 | B1 | 10/2001 | Min et al. |
| 6,324,495 | B1 | 11/2001 | Steinman |
| 6,356,106 | B1 | 3/2002 | Greeff et al. |
| 6,366,984 | B1 | 4/2002 | Carmean et al. |
| 6,442,162 | B1 | 8/2002 | O'Neill et al. |
| 6,466,227 | B1 | 10/2002 | Pfister et al. |
| 6,564,331 | B1 | 5/2003 | Joshi |
| 6,594,234 | B1 | 7/2003 | Chard et al. |
| 6,598,123 | B1* | 7/2003 | Anderson et al. .......... 711/133 |
| 6,601,144 | B1* | 7/2003 | Arimilli et al. ............. 711/146 |
| 6,631,447 | B1* | 10/2003 | Morioka et al. ............ 711/141 |
| 6,647,428 | B1 | 11/2003 | Bannai et al. |
| 6,662,305 | B1 | 12/2003 | Salmon et al. |
| 6,735,174 | B1 | 5/2004 | Hefty et al. |
| 6,775,693 | B1 | 8/2004 | Adams |
| 6,799,232 | B1 | 9/2004 | Wang |
| 6,874,054 | B2 | 3/2005 | Clayton et al. |
| 6,880,028 | B2 | 4/2005 | Kurth |
| 6,889,266 | B1 | 5/2005 | Stadler |
| 6,894,978 | B1 | 5/2005 | Hashimoto |
| 6,954,887 | B2 | 10/2005 | Wang et al. |
| 6,986,026 | B2 | 1/2006 | Roth et al. |
| 7,007,123 | B2 | 2/2006 | Golla et al. |
| 7,058,826 | B2 | 6/2006 | Fung |
| 7,065,594 | B2 | 6/2006 | Ripy et al. |
| 7,143,219 | B1 | 11/2006 | Chaudhari et al. |
| 7,191,373 | B2 | 3/2007 | Wang et al. |
| 7,239,565 | B2 | 7/2007 | Liu |
| 7,280,477 | B2 | 10/2007 | Jeffries et al. |
| 7,298,746 | B1 | 11/2007 | De La Iglesia et al. |
| 7,363,629 | B2 | 4/2008 | Springer et al. |
| 7,373,420 | B1 | 5/2008 | Lyon |
| 7,401,245 | B2 | 7/2008 | Fischer et al. |
| 7,454,640 | B1 | 11/2008 | Wong |
| 7,454,641 | B2 | 11/2008 | Connor et al. |
| 7,461,236 | B1 | 12/2008 | Wentzlaff |
| 7,463,529 | B2 | 12/2008 | Matsubara |
| 7,502,474 | B2 | 3/2009 | Kaniz et al. |
| 7,539,845 | B1 | 5/2009 | Wentzlaff et al. |
| 7,613,971 | B2 | 11/2009 | Asaka |
| 7,620,696 | B2* | 11/2009 | Van Doren et al. .......... 709/217 |
| 7,620,791 | B1 | 11/2009 | Wentzlaff et al. |
| 7,669,012 | B2* | 2/2010 | Blumrich et al. ............ 711/146 |
| 7,698,581 | B2 | 4/2010 | Oh |
| 2001/0055323 | A1 | 12/2001 | Rowett et al. |
| 2002/0078420 | A1 | 6/2002 | Roth et al. |
| 2002/0087801 | A1 | 7/2002 | Bogin et al. |
| 2002/0100020 | A1* | 7/2002 | Hunter et al. ................ 717/124 |
| 2002/0112132 | A1* | 8/2002 | Lesmanne et al. ........... 711/141 |
| 2002/0129086 | A1 | 9/2002 | Garcia-LunaAceves et al. |
| 2002/0138801 | A1 | 9/2002 | Wang et al. |
| 2002/0156979 | A1 | 10/2002 | Rodriguez |
| 2002/0184159 | A1 | 12/2002 | Tadayon et al. |
| 2003/0007457 | A1 | 1/2003 | Farrell et al. |
| 2003/0028749 | A1 | 2/2003 | Ishikawa et al. |
| 2003/0050714 | A1 | 3/2003 | Tymchenko |
| 2003/0050954 | A1 | 3/2003 | Tayyar et al. |
| 2003/0074616 | A1 | 4/2003 | Dorsey |
| 2003/0105799 | A1 | 6/2003 | Khan et al. |
| 2003/0163649 | A1* | 8/2003 | Kapur et al. ................. 711/146 |
| 2003/0177335 | A1 | 9/2003 | Luick |
| 2003/0188053 | A1 | 10/2003 | Tsai |
| 2003/0235202 | A1 | 12/2003 | Van Der Zee et al. |
| 2004/0003184 | A1* | 1/2004 | Safranek et al. ............. 711/146 |
| 2004/0019730 | A1 | 1/2004 | Walker et al. |
| 2004/0024925 | A1 | 2/2004 | Cypher et al. |
| 2004/0073780 | A1* | 4/2004 | Roth et al. ................... 712/227 |
| 2004/0103218 | A1 | 5/2004 | Blumrich et al. |
| 2004/0210694 | A1 | 10/2004 | Shenderovich |
| 2004/0243739 | A1 | 12/2004 | Spencer |
| 2005/0007986 | A1 | 1/2005 | Malladi et al. |
| 2005/0053057 | A1 | 3/2005 | Deneroff et al. |
| 2005/0076163 | A1 | 4/2005 | Malalur |
| 2005/0160238 | A1* | 7/2005 | Steely et al. ................. 711/145 |
| 2005/0198192 | A1* | 9/2005 | Van Doren et al. .......... 709/217 |
| 2005/0216613 | A1 | 9/2005 | Ganapathy et al. |
| 2005/0251613 | A1 | 11/2005 | Kissell |
| 2005/0270886 | A1 | 12/2005 | Takashima |
| 2005/0273564 | A1 | 12/2005 | Lakshmanamurthy et al. |
| 2006/0050737 | A1 | 3/2006 | Hsu |
| 2006/0080513 | A1* | 4/2006 | Beukema et al. ............ 711/141 |
| 2006/0206635 | A1 | 9/2006 | Alexander et al. |
| 2006/0224837 | A1* | 10/2006 | Blumrich et al. ............ 711/146 |
| 2006/0248367 | A1 | 11/2006 | Fischer et al. |
| 2006/0259705 | A1* | 11/2006 | Cousin et al. ............... 711/144 |
| 2007/0055832 | A1 | 3/2007 | Beat |
| 2007/0083715 | A1* | 4/2007 | Vanderpool ................. 711/141 |
| 2007/0133536 | A1 | 6/2007 | Kim et al. |
| 2007/0168803 | A1 | 7/2007 | Wang et al. |
| 2007/0174529 | A1 | 7/2007 | Rodriguez et al. |
| 2007/0180197 | A1* | 8/2007 | Wright et al. ................ 711/141 |
| 2007/0195774 | A1 | 8/2007 | Sherman et al. |
| 2008/0147987 | A1* | 6/2008 | Cantin et al. ................ 711/141 |
| 2009/0006769 | A1* | 1/2009 | Blumrich et al. ............ 711/146 |

OTHER PUBLICATIONS

Michel, Dubois, Christoph Scheurich, Fayé A. Briggs, Synchronization, Coherence, and Event Ordering in Multiprocessors, Computer, v.21 n.2, p. 9-21, Feb. 1988.*

Giampapa, M. E., et al., "Blue Gene/L advanced diagnostics environment," IBM J. Res. & Dev., vol. 49, No. 2/3, Mar./May 2005, pp. 319-331.

IBM Journal of Research and Development, Special Double Issue on Blue Gene, vol. 49, Nos. 2/3, Mar./May 2005 ("Preface").

IBM Journal of Research and Development, Special Double Issue on Blue Gene, vol. 49, Nos. 2/3, Mar./May 2005 ("Intro").

Definition of "mechanism", Oxford English Dictionary, http://dictionary.oed.com/cgi/entry/00304337?query_type=word&queryword=mechanism&first=1&max_to_show=10&sort_type=alpha&result_place=2&search_id=y2atEIGc-11603&hilite+ 00304337.

Almasi, et al., "MPI on BlueGene/L: Designing an Efficient General Purpose Messaging Solution for a Large Cellular System," IBM Research Report RC22851 (W037-150) Jul. 22, 2003.

Almasi, et al., "Optimization of MPI Collective Communication on BlueGene/L Systems," ICS'05, Jun. 20-22, 2005, Boston, MA.

Gara, et al., "Overview of the Blue Gene/L system architecture," IBM J. Res. & Dev., vol. 49, No. 2/3, Mar./May 2005, pp. 195-212.

Huang, et al., "Performance Evaluation of Adaptive MPI," PPoPP'06, Mar. 29-31, 2006, New York, New York.

MPI (Message Passing Interface) standards documents, errata, and archives http://www.mpi-forum.org visited Jun. 16, 2007 (Sections 4.2, 4.4 and 10.4).

"Intel 870: A Building Block For Cost-Effective, Scalable Servers", Faye Briggs, Michel et al., pp. 36-47, Mar.-Apr. 2002.

Pande, et al., Performance Evaluation and Design Trade-Offs for Network-On-Chip Interconnect Architectures, 2005, IEEE, pp. 1025-1040.

* cited by examiner

METHOD AND APPARATUS FOR SINGLE-STEPPING COHERENCE EVENTS IN A MULTIPROCESSOR SYSTEM UNDER SOFTWARE CONTROL

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract. No. B554331 awarded by the Department of Energy.

CROSS-REFERENCE TO RELATED APPLICATIONS

The present invention is related to the following commonly-owned, co-pending United States Patent Applications filed on even date herewith, the entire contents and disclosure of each of which is expressly incorporated by reference herein as if fully set forth herein. U.S. patent application Ser. No. 11/768,777, for A SHARED PERFORMANCE MONITOR IN A MULTIPROCESSOR SYSTEM; U.S. patent application Ser. No. 11/768,645, for OPTIMIZED COLLECTIVES USING A DMA ON A PARALLEL COMPUTER; U.S. patent application Ser. No. 11/768,781, for DMA SHARED BYTE COUNTERS IN A PARALLEL COMPUTER; U.S. patent application Ser. No. 11/768,784, for MULTIPLE NODE REMOTE MESSAGING; U.S. patent application Ser. No. 11/768,697, for A METHOD AND APPARATUS OF PREFETCHING STREAMS OF VARYING PREFETCH DEPTH; U.S. patent application Ser. No. 11/768,532, for PROGRAMMABLE PARTITIONING FOR HIGH-PERFORMANCE COHERENCE DOMAINS IN A MULTIPROCESSOR SYSTEM; U.S. patent application Ser. No. 11/768,547, for INSERTION OF COHERENCE EVENTS INTO A MULTIPROCESSOR COHERENCE PROTOCOL; U.S. patent application Ser. No. 11/768,791, for METHOD AND APPARATUS TO DEBUG AN INTEGRATED CIRCUIT CHIP VIA SYNCHRONOUS CLOCK STOP AND SCAN; U.S. patent application Ser. No. 11/768,795, for DMA ENGINE FOR REPEATING COMMUNICATION PATTERNS; U.S. patent application Ser. No. 11/768,799, for METHOD AND APPARATUS FOR A CHOOSE-TWO MULTI-QUEUE ARBITER; U.S. patent application Ser. No. 11/768,800, for METHOD AND APPARATUS FOR EFFICIENTLY TRACKING QUEUE ENTRIES RELATIVE TO A TIMESTAMP; U.S. patent application Ser. No. 11/768,572, for BAD DATA PACKET CAPTURE DEVICE; U.S. patent application Ser. No. 11/768,593, for EXTENDED WRITE COMBINING USING A WRITE CONTINUATION HINT FLAG; U.S. patent application Ser. No. 11/768,805, for A SYSTEM AND METHOD FOR PROGRAMMABLE BANK SELECTION FOR BANKED MEMORY SUBSYSTEMS; U.S. patent application Ser. No. 11/768,905, for AN ULTRASCALABLE PETAFLOP PARALLEL SUPERCOMPUTER; U.S. patent application Ser. No. 11/768,810, for SDRAM DDR DATA EYE MONITOR METHOD AND APPARATUS; U.S. patent application Ser. No. 11/768,812, for A CONFIGURABLE MEMORY SYSTEM AND METHOD FOR PROVIDING ATOMIC COUNTING OPERATIONS IN A MEMORY DEVICE; U.S. patent application Ser. No. 11/768,559, for ERROR CORRECTING CODE WITH CHIP KILL CAPABILITY AND POWER SAVING ENHANCEMENT; U.S. patent application Ser. No. 11/768,552, for STATIC POWER REDUCTION FOR MIDPOINT-TERMINATED BUSSES; U.S. patent application Ser. No. 11/768,527, , for COMBINED GROUP ECC PROTECTION AND SUBGROUP PARITY PROTECTION; U.S. patent application Ser. No. 11/768,669, for A MECHANISM TO SUPPORT GENERIC COLLECTIVE COMMUNICATION ACROSS A VARIETY OF PROGRAMMING MODELS; U.S. patent application Ser. No. 11/768,813, for MESSAGE PASSING WITH A LIMITED NUMBER OF DMA BYTE COUNTERS; U.S. patent application Ser. No. 11/768,619, for ASYNCRONOUS BROADCAST FOR ORDERED DELIVERY BETWEEN COMPUTE NODES IN A PARALLEL COMPUTING SYSTEM WHERE PACKET HEADER SPACE IS LIMITED; U.S. patent application Ser. No. 11/768,682, for HARDWARE PACKET PACING USING A DMA IN A PARALLEL COMPUTER; and U.S. patent application Ser. No. 11/768,752, for POWER THROTTLING OF COLLECTIONS OF COMPUTING ELEMENTS.

BACKGROUND OF THE INVENTION

1. Field of the Invention

The present invention generally relates to multiprocessor systems and, more particularly, to a novel technique for examining coherence request processing in a multiprocessor system.

2. Description of the Prior Art

To achieve high performance computing, multiple individual processors have been interconnected to form multiprocessor computer systems capable of parallel processing. Multiple processors can be placed on a single chip, or several chips—each containing one or several processors, forming so-called "compute nodes", which interconnect into a multiprocessor computer system.

Processors in a multiprocessor computer system use private cache memories because of their short access time (a cache is local to a processor and provides fast access to data) and to reduce the number of memory requests to the main memory. However, managing caches in a multiprocessor system is complex. Multiple private caches introduce the multi-cache coherency problem (or stale data problem) due to multiple copies of main memory data that can concurrently exist in the caches of the multiprocessor system.

The protocols that maintain the coherence between multiple processors are called cache coherence protocols. Cache coherence protocols track any sharing of data blocks (e.g. lines, block and words) between the processors. For example, MESI is a common coherence protocol where every hardware cache line can be in one of four states: modified (M), exclusive (E), shared (S), or invalid (I). Line states are changed by memory references issued by the processors.

In a coherent multiprocessor system, a memory reference issued by one processor can affect the caches of other processors. For example, when a processor stores to a line, the coherence mechanism must insure that eventually all caches either have the new data or have no data for that line at all. This generally involves inter-processor communication for testing the state of the line in the various caches and changing the state, if necessary. Commonly, such inter-processor communication is conducted by passing packets containing coherence protocol actions and responses between processors.

One group of cache coherence protocols is referred to as snooping. In a snooping cache coherence approach, no centralized system coherence state is kept, but rather each cache keeps the sharing status of data blocks locally. The caches are usually on a shared memory bus, and all cache controllers snoop (monitor) the bus to determine whether they have a copy of the data block requested. A commonly used snooping method is the "write-invalidate" protocol. In this protocol, a processor ensures that it has exclusive access to data before it writes that data. On each write, all processors snoop on the bus and check their caches to see if the address written to is also located in their caches. If so, the data corresponding to this address are invalidated. If two or more processors attempt to write the same data simultaneously, only one of them wins the race, causing the other processors' copies to be invalidated.

When a cache coherence request is not properly handled, which may occur for several reasons, an error is introduced in the system. This error may manifest itself much later in the processing, or not at all. Achieving proper handling of coherence requests in a multiprocessor system is one of the biggest challenges in a multiprocessor design. Designers and programmers employ various techniques called debugging to determine the source or sources of any errors.

Sometimes, in debugging a multiprocessor system, it is advantageous to be able to control coherence traffic by having control over coherence events being transferred between processors to enable easier debugging of a multiprocessor coherence mechanism. In a uniprocessor environment, single-stepping is a widely used approach for debugging uniprocessor systems, used to understand their behavior, and detect errors. For example, U.S. Pat. No. 6,986,026 issued to Roth, et al describes a technique for causing a single processor to process one instruction at a time. Uniprocessor single-stepping is executed by taking an exception after each instruction or by invoking an emulator. Roth's disclosure does not describe techniques for debugging a multiprocessor system, and does not describe how to debug coherence requests.

It is desirable to be able to single-step coherence events transferred between processors in a multiprocessor system. Thus, coherence events which are active at a certain processor cycle in a compute node could be processed in a single-step, allowing for designers and programmers to easily troubleshoot multiprocessor systems.

Having set forth the limitations of the prior art, it is clear that what is required is a technique for monitoring coherence event processing in a multiprocessor system.

SUMMARY OF THE INVENTION

It is therefore an object of the present invention to provide a simple technique and method for monitoring the processing of coherence events transferred between processors in cache coherent multiprocessor computer systems.

An aspect of the present invention is to provide an apparatus for monitoring the processing of coherence event signals in a multiprocessor system, said multiprocessor system having a plurality of processors, each processor having a dedicated memory storage device, said processors generating coherence events broadcast to other processors, each said processor having an associated snoop unit comprising: a plurality of multiple coherence ports for receiving said coherence event signals from each processor in said multiprocessor system; a coherence traffic processing unit for processing said coherence event signals and forwarding said processed coherence event signals to said processor to which said snoop unit is attached; a coherence port to processor unit for receiving and transmitting said forwarded coherence event signals from said coherence traffic processing unit to said processor; one or more mode registers programmed to receive one or more bits values that, when set, initiate performing a single-step operation in said multiprocessor system; and one or more single-step registers programmed to receive one or more bit values that, when set, initiate processing of a single coherence event signal in a single-step operation mode.

Another aspect of the present invention is a computer-implemented method for monitoring the processing of coherence events in a multiprocessor system, the method comprising the steps of: clearing the memory of a plurality of step registers disposed in a snoop unit; mapping the step registers into a plurality of memory address space; and determining if a bit value has been written into the step registers, wherein if a bit value has been written into the step registers, the computer-implemented method will proceed in a single-step mode and if no bit value has been written into the step registers, the computer-implemented method will proceed in a normal execution mode, wherein the single-step mode provides for processing of coherence requests to the processor in single steps and the normal execution mode provides for processing of the coherence requests to the processor in the normal course.

According another aspect of the present invention, a processor in a multiprocessor system is presented with only coherence requests active at a certain point in time for debugging purposes. Once these coherence requests are processed, the processing continues after an input from the user or from a program. This is accomplished by adding a programmable single-step register, which, when set, enables processing of exactly one step of coherence traffic.

According to another embodiment of the present invention, the step registers are accessible and programmable by all processors in a multiprocessor subsystem.

According to yet another embodiment of the present invention, writing to the step registers can be performed by an associated processor, by another processor in the multiprocessor system, or a processor external to the multiprocessor system.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

Hereinafter, embodiments of the present invention will be described in detail with reference to the accompanying drawings. For the purposes of clarity and simplicity, a detailed description of known functions and configurations incorporated herein will be omitted as it may make the subject matter of the present invention unclear.

Figure 1:
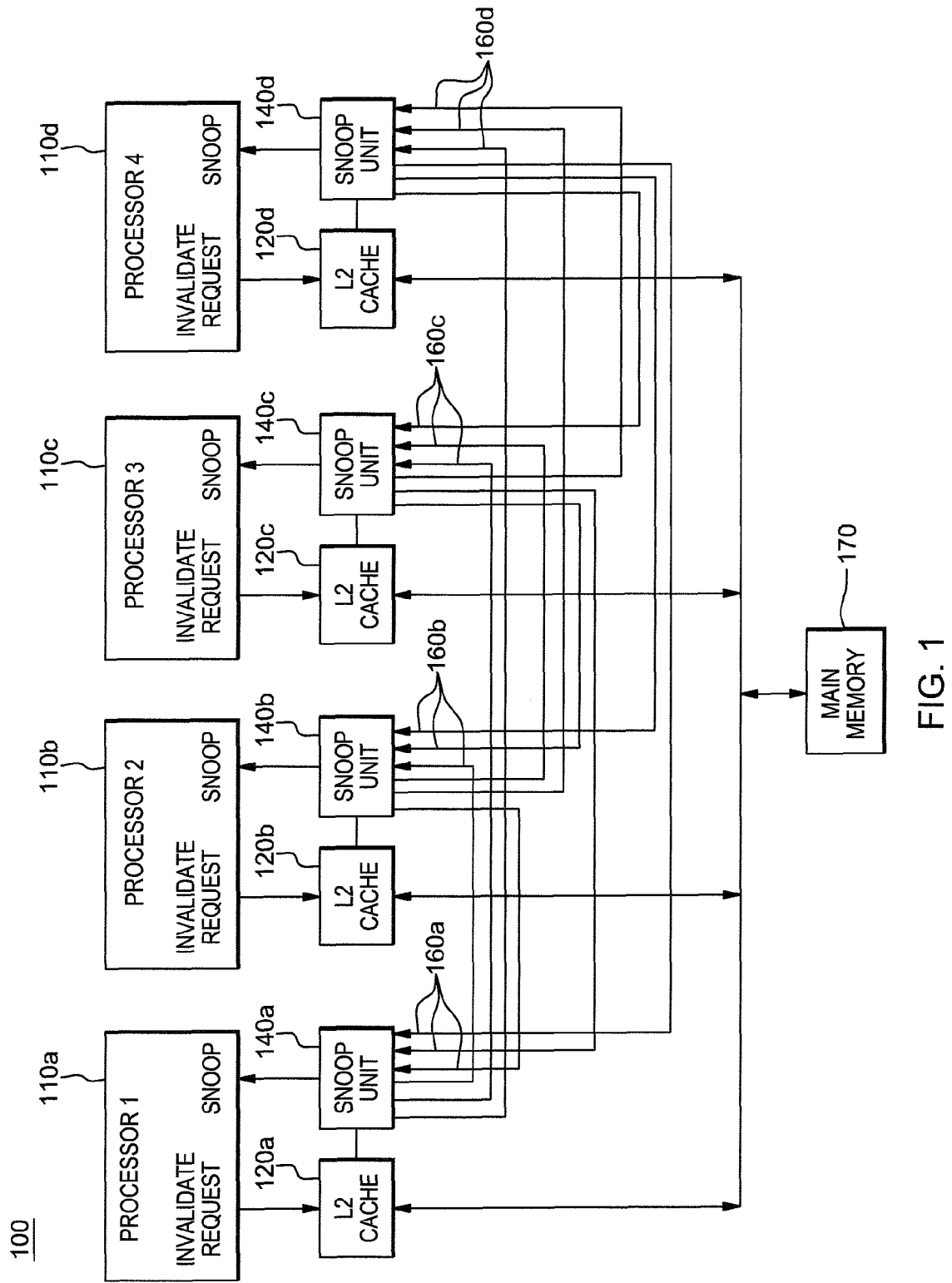
FIG. 1 is an illustration of the overall base architecture of the multiprocessor system using a snooping approach for cache coherency, according to one embodiment of the present invention.
Figure 2:
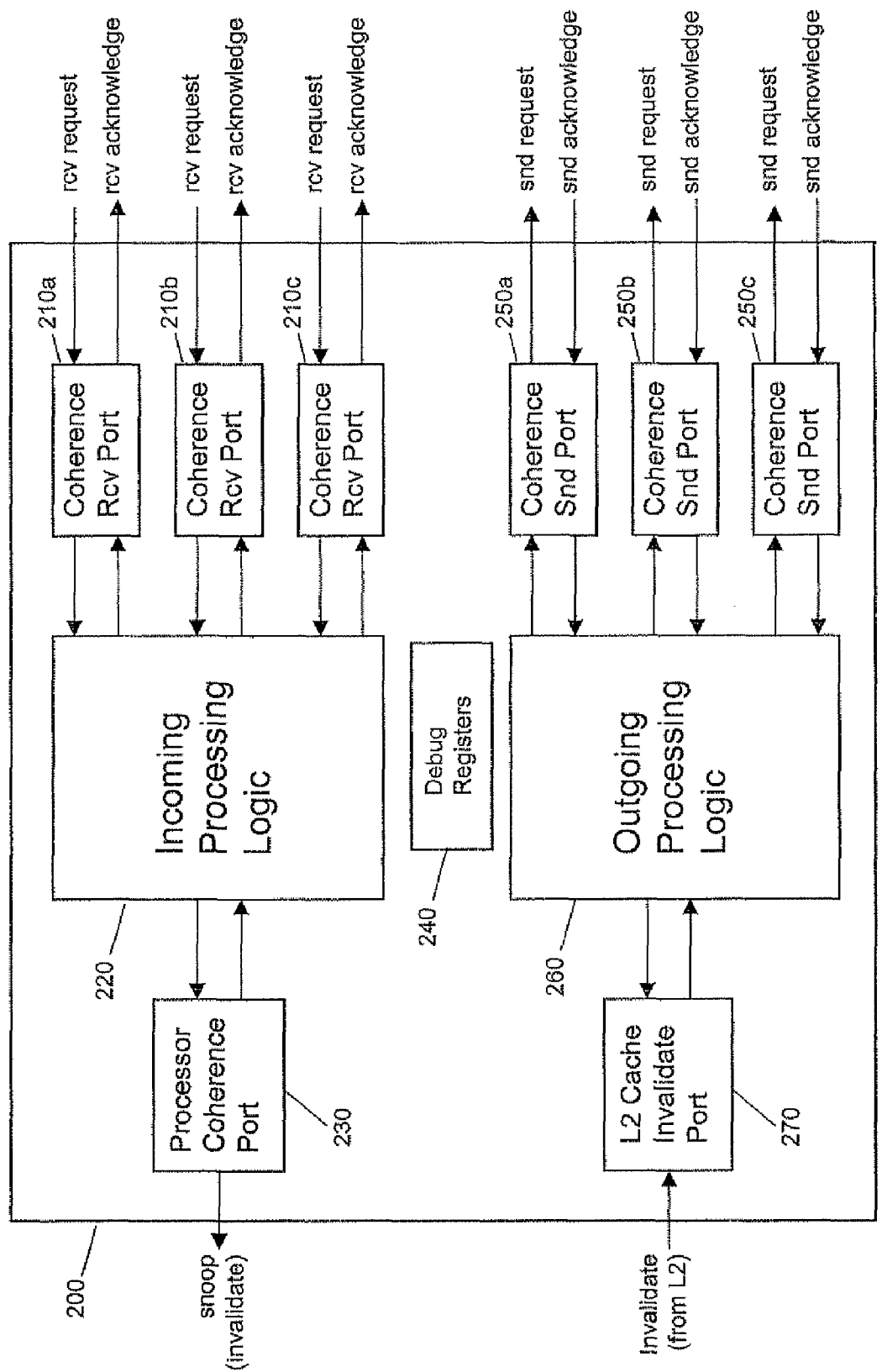
FIG. 2 is an illustration a schematic representation of a single snoop unit 200 associated with a processor in the multiprocessor system of FIG. 1, according to one embodiment of the present invention.
Figure 4:
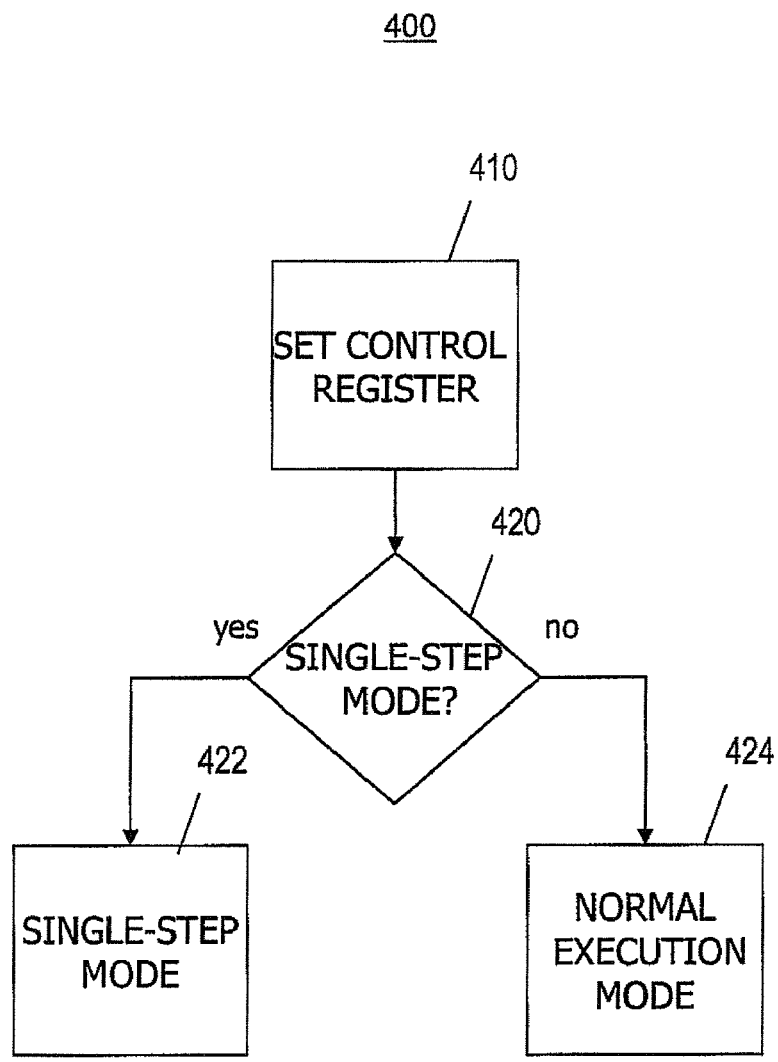
FIG. 4 is a flowchart depicting the control flow for the snoop unit to select the operation mode according to a preferred embodiment of the present invention.
Figure 5:
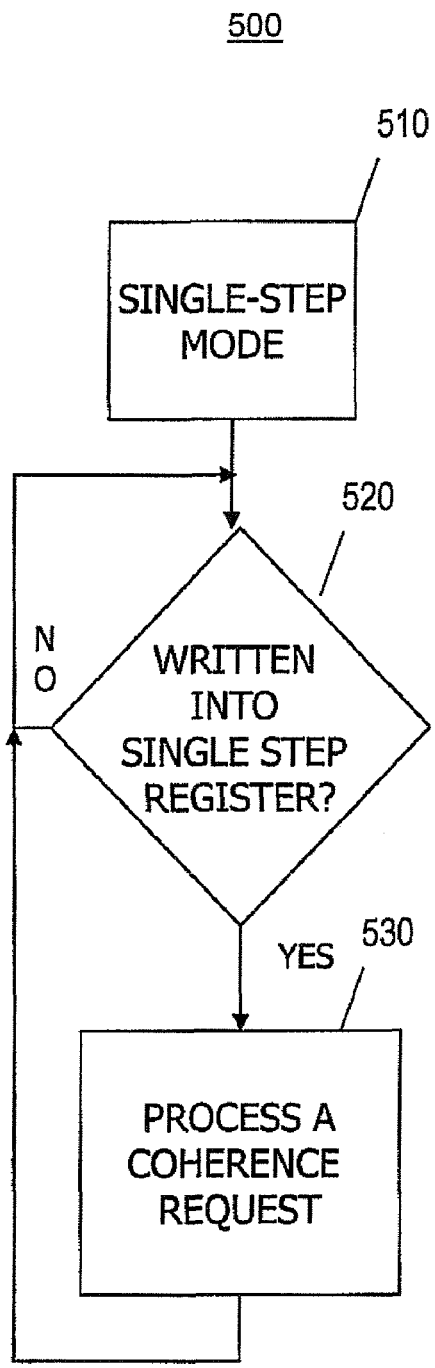
FIG. 5 is a flowchart depicting the control flow for the snoop unit in FIG. 2, operating in single-step mode in accordance with the present invention.

The following disclosure clarifies the overall structure of an apparatus for monitoring the behavior of a coherence mechanism by single-stepping coherence events in a multiprocessor system under software control, where a novel snoop unit associated with a processor is described in reference to FIG. 1. FIG. 2 will then clarify the structure of a novel processor coherence port and step registers provided within the novel snoop unit. Then, in reference to FIG. 3, the logic relevant to the novel processor coherence port and step registers are clarified. FIGS. 4 and 5 will clarify how a state machine 312 controls data flow by controlling a data path 314 within a processor coherence port 230 so as to provide the means of single-stepping coherence events.

Referring now to FIG. 1, there is shown the overall base architecture of the multiprocessor system 100 with the use of a snooping approach for cache coherency. In the preferred embodiment, the massively parallel computing structures is composed of 4 processors 110a, . . . , 110d (or central processing units CPUs) with their local first-level (L1) data and instruction caches, and their associated second-level (L2) caches 120a, . . . , 120d. In the preferred embodiment, the processor cores 110a, . . . , 110d are identical, but any combination of various processors in a single multiprocessor system can be used without departing from the scope of this invention. As will become obvious, the multiprocessor system 100 can consist of any feasible number of processors without departing from the scope of the invention.

To implement the write-invalidate memory coherence protocol, a snoop unit 140a, . . . , 140d is provided for each respective processor core 110a, . . . , 110d in the multiprocessor system 100. For transferring coherence request signals, the preferred embodiment implements a plurality of point-to-point interconnection for coherence traffic 160a, . . . 160d, wherein each processor's associated snoop unit is directly connected with each snoop unit associated with every other processor in the system. It is to be understood that, without departing from the scope of the present invention, in another embodiment, a system bus can be used to interconnect a predetermined number of snoop units, or that a single or multiple ring interconnect can be used, or that a switch can be used, or that both memory and coherence traffic can share the same system interconnect, or that the memory and coherence traffic can be separated, as one skilled in the art will appreciate.

All coherence request signals from a single processor are forwarded to that processor's snoop unit 140a, . . . , 140d by the associated L2 cache 120a, . . . , 120d, which then broadcasts them as invalidation request signals to the remote snoop units of other processors. The snoop unit receives all invalidation request signals for that particular processor from remote snoop units and forwards them to the L1 cache within the processor. The snoop unit may optionally include one or more snoop filters that reduce the number of invalidations presented to the processor. A snoop filter is described in U.S. Patent Application Publication No. US2006/0224835A1, issued to Blumrich, et al and entitled "Snoop Filtering System in a Multiprocessor system."

Referring now to FIG. 2, a schematic representation of a single snoop unit 200 associated with a processor 100 in the multiprocessor system of FIG. 1 is illustrated. FIG. 2 provides a more detailed view of the snoop unit in FIG. 1, with particular emphasis on the structure of a novel processor coherence port 230 and step registers 240 providing the means of single-stepping coherence events. As shown in FIG. 2, the snoop unit 200 includes multiple coherence rcv ports 210a, . . . , 210c that operate in parallel. Each port depicted in FIG. 2 has three point-to-point interconnections for coherence traffic 160a, . . . , 160d, where each port is dedicated to only one source of three memory writers (not shown) disposed in a sending snoop unit and provides a linking and queuing function for the receiving snoop unit. As will become obvious, the multiprocessor system 100 can consist of any feasible number of point-to-point interconnection for coherence traffic 160a, . . . , 160d and associated memory writers without departing from the scope of the invention. Without departing from the scope of the invention, the snoop unit 200 could further include additional coherence rcv ports 210a, . . . , 210c, for additional memory writers such as a direct memory access (DMA) unit (not shown).

In operation, the incoming processing logic 220 processes the incoming coherence events received on coherence rcv ports 210, and forwards them in a sequential manner to its associated processor as shown in FIG. 1 via the processor coherence port 230. Incoming processing logic 220 provides for serializing the received coherence events and also provides a processor flow-control function in conjunction with the associated processor. The incoming processing logic 220 may optionally include snoop filtering logic to eliminate coherence events that are known to be useless. The snoop unit 200 has one or more special step registers 240, which can be programmed under software control for example, via a remote control computer or like service node or device. The bit values of the step registers 240 determine the mode of operation of the snoop unit 200, and can cause coherence event processing to proceed in single steps in the multiprocessor system.

The snoop unit 200 also includes outgoing processing logic 260 that receives invalidate requests from the L2 cache associated with the snoop unit 200 as shown in FIG. 1, by way of the L2 caché invalidate port 270. The invalidate request processing logic is responsible for broadcasting invalidation request coherence events to all remote snoop units using a point-to-point flow-control protocol such as a token-based scheme. The flow-control protocol is implemented in the coherence snd ports 250a, . . . , 250c, each of which is connected to a single, remote coherence rcv port 210.

In the preferred embodiment, the outgoing processing logic 260 receives invalidate requests from the L2 cache associated with the snoop unit 200. In another embodiment, the outgoing processing logic receives invalidate requests from the L1 cache associated with the processor and the snoop unit 200.

In the preferred embodiment shown in FIG. 2, all coherence events are received at the coherence rcv ports 210a, . . . , 210c, having one processor port per memory writer. In another embodiment, there is only one coherence port shared between all memory writers. Moreover, as known to those skilled in the art, this embodiment including only one coherence port would provide serialization of each coherence writer's access to a single port and would be performed by a single coherence traffic interconnect as opposed to the point-to-point interconnection for coherence traffic 160a, . . . , 160d shown in FIG. 1. In yet another embodiment, there is a limited number of coherence ports, where all of them or some of them are shared between one subgroup of memory writers, and some of the coherence ports may be dedicated to a single memory writer. It is to be understood that other configurations are also possible without departing from the scope of this invention.

Similarly, in the preferred embodiment shown in FIG. 2, all received coherence events are processed in parallel in the incoming processing logic 220. In another embodiment, coherence events could be processed sequentially (not shown), where serialization of coherence events is performed either internally to the snoop unit 200, or external to it, or some combination of these. In yet another embodiment, some combination of serial and parallel processing of coherence events is implemented without departing from the scope of this invention, as will be understood by those skilled in the art.

As shown in the preferred embodiment in FIG. 2, there is only one processor coherence port 230, which presents coherence requests to the processor sequentially. In another a preferred embodiment, for example, where multiple processor coherence ports are provided, coherence events are presented to the processor coherence port 230 in parallel. In yet another embodiment, some combination of serial and parallel presenting of coherence requests to the processor is implemented without departing from the scope of this invention, as will be understood by those skilled in the art.

As known to those skilled in the art, in some circumstances, it might be advantageous to present coherence events to the processor one step at a time, and then to examine the state of some memory elements like registers located in the processor, snoop unit, or anywhere else in the multiprocessor system before continuing with processing of more coherence events. Single-step processing is a widely appreciated and used method of debugging a system in uniprocessor systems to understand if an error is induced by software, applications, or hardware, and to identify that error. Debugging may take place during the system hardware and software development phase, or after the system is incorporated in a product, as a tool for software development. There is no known application of single-stepping coherence protocol processing in multiprocessor systems to examine coherence events.

As mentioned above, with respect to FIGS. 1 and 2, each snoop unit 140 has one or more special step registers 240 for single-stepping purposes. By writing into these step registers, coherence events are inserted in the multiprocessor system 100 one at a time. In other words, the step registers 240 determine if the snoop unit will operate by proceeding in a normal execution mode, or operate in a single-step mode. The possible modes of control are "execution" mode, and "single-step" mode.

In a preferred embodiment, for example, the step registers 240 are mapped in the memory address space, and are accessible and programmable by all the processors in the multiprocessor system 100. In another embodiment, the step registers 240 are accessible and programmable by the associated processor 100 only. In yet another embodiment, the step registers 240 are accessible and programmable via a special interface which can be accessed from outside of the multiprocessor system 100. In yet another embodiment, the step registers 240 can be accessed in more than one way, using some combination of the above specified methods, as will be understood by those skilled in the art.

Figure 3:
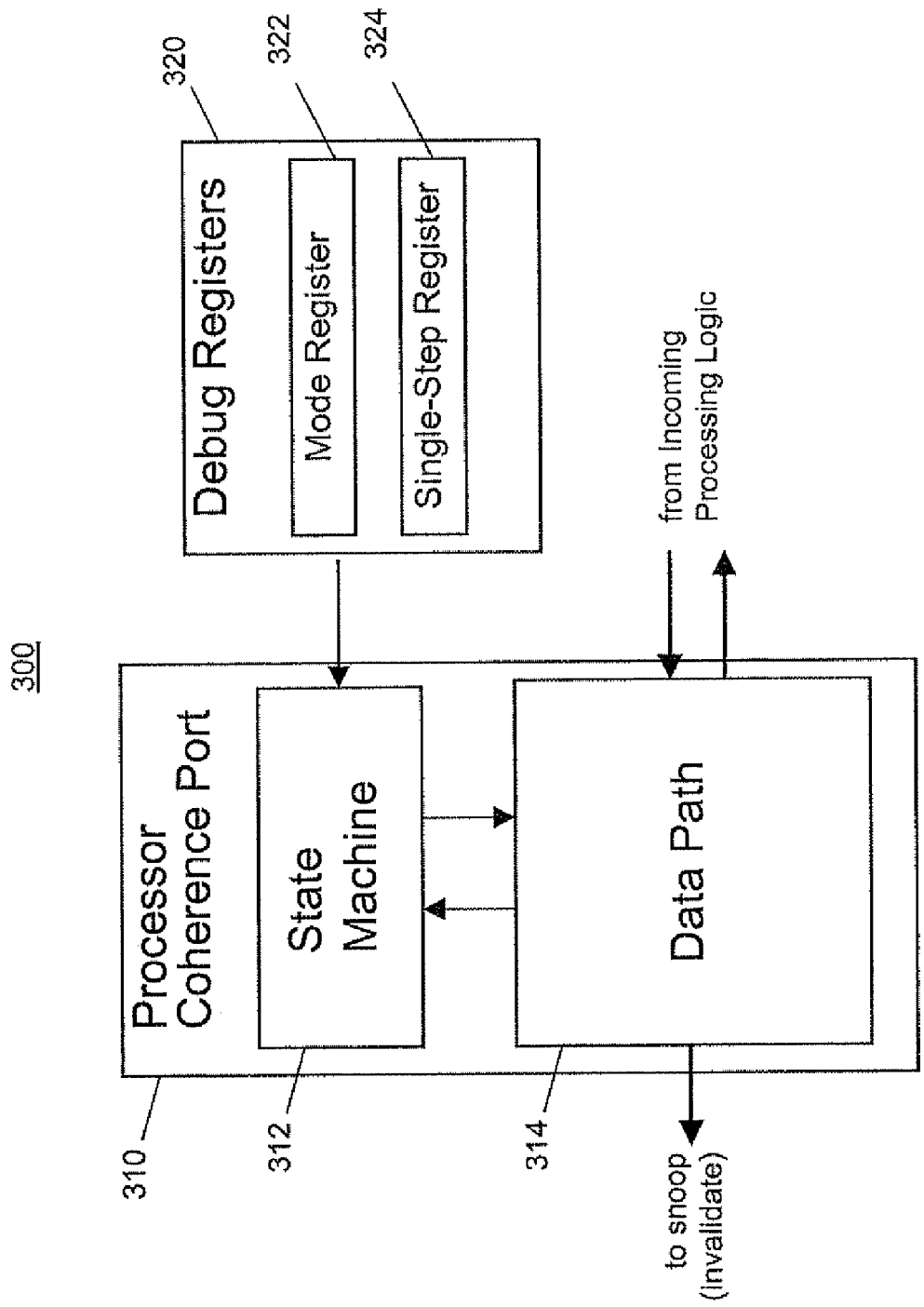
FIG. 3 illustrates the logic relevant to coherence event single-stepping within the Processor Coherence Port and Step Registers shown in FIG. 2, according to one embodiment of the present invention.

Referring now to FIG. 3, illustrates the logic relevant to coherence event single-stepping within the processor coherence port and step registers 300 shown in FIG. 2, according to one embodiment of the present invention. As can be seen in FIG. 3, coherence event requests and acknowledgements are processed by the data path 314 under control of the State Machine 312. The bit value of a mode register 322 determines whether the state machine 312 operates in normal execution mode or single-step mode. In other words, the bit values of the mode register 322 either generates control signals to enable coherence requests to be forwarded to the processor by the processor coherence port 230 (normal mode) or stalls the coherence requests at the processor coherence port (single-step mode). The mode register 322 is accessible and programmable by an associated processor, any other processor in the multiprocessor system or via a special interface (service node) which can be accessed from outside of the multiprocessor system 100, as will be understood by those skilled in the art.

In normal execution mode, the state machine 312 implements a flow-control policy to move coherence events from the incoming processing logic 220 to the snoop input of the processor as fast as possible, without losing any events due to congestion of the processor snoop input. If that port indicates that it can no longer accept snoop requests (e.g. the internal cache is busy performing lookups on behalf of the processor pipeline), then the state machine 312 stops the flow of the data path 314 until the processor indicates that it can accept snoop requests.

Single stepping exploits the existing flow-control mechanism of the state machine. When the bit value of the mode register 322 enables single-step mode, the state machine 312 stops the flow of the data path 314, regardless of whether the processor snoop input is capable of accepting snoop requests. Every time the single-step register 324 is written to, a single snoop request is advanced into the snoop input of the processor, so long as the snoop input is ready to accept the request.

Those skilled in the art will recognize that there are various possible implementations of the step registers 240 shown in FIG. 2. For example, a single register could be used, where writing the value that enables single-step mode would cause a single step to occur, rather than having a separate single-step register. All that is needed is a mechanism to toggle the state machine 312 between normal execution and single-step modes, and a mechanism to cause the state machine 312 to advance one snoop request.

Those skilled in the art will recognize that single-stepping as described in the preferred embodiment, could be applied to any coherence event, not just coherence request signals as described for the preferred embodiment. That is, any message or signal sent between processors on behalf of the coherence protocol could be processed one step at a time as disclosed in the preferred embodiment for the purpose of observing the effect of the message or signal. For example, as shown in FIG. 1, coherence acknowledgements sent from one snoop unit 140 back to another remote snoop unit 140 that sent coherence requests could be single-stepped in order to observe the processing of those acknowledgements for debugging or any other purpose.

It will now be explained in reference to FIGS. 4 and 5 how the state machine 312 controls data flow by controlling the data path 314 in a processor coherence port so as to provide the means of single-stepping coherence events.

FIG. 4 is a flowchart depicting the control flow for a snoop unit to select the operational mode 400, according to the present invention. In the preferred embodiment the state machine polls the mode register 322 shown in FIG. 3 continuously and switches mode when the bit values in the mode register 322 indicate a change in the bit values. The change in bit values, as mentioned above are accessible and programmable by an associated processor, any other processor in the multiprocessor system or via a special interface (service node). At the start of operation, the step registers are set, as indicated at step 410. Within the mode register, there are one or more mode control bits. Depending on the value associated to these mode control bits, different modes of operation are selected, as indicated at step 420.

If a bit or combination of several bits of the mode control register are set to select the normal execution mode, the control flow proceeds to step 424, and the processing of coherence requests will proceed in a normal execution mode. If, however, a bit or combination of several bits are set to select the single-step mode, the control flow proceeds to step 422 where the coherence request processing will proceed in single-step mode.

Referring now to FIG. 5, a flowchart is provided depicting the control flow for the snoop unit in FIG. 2, operating in single-step mode 500 in accordance with the present invention. The single-step mode of operation is selected at step 510. At step 520, the single-step register 324 is polled by state machine 312 to determine if a predetermined bit value is in the single-step register 324 when in single-step mode. A write to this register can be performed by the associated processor, by some other processor in the multiprocessor system, or external to the multiprocessor system. Writing into this register initiates application of logic in the snoop unit 140 for forwarding a single coherence event signal to the processor. The single-step register can be a separate register from the mode register, or a bit-field within the mode register. If no write to the single-step register is performed, the control loops back to step 520 to wait for the next write from the processor.

Writing into the single-step register 240 causes control to proceed to step 530, where exactly one step of operation is performed, for example, a single coherence event signal is presented to the processor. The control loops back to step 520, waiting for the next write to the single-step register.

If at any step, it is determined that the selected mode of operation is execution mode, the control exits single-step mode, and proceeds in execution mode processing coherence requests as fast as possible.

As will be readily apparent to those skilled in the art, the present invention or aspects of the invention can be realized in hardware, or as some combination of hardware and software. Any kind of computer/server system(s)—or other apparatus adapted for carrying out the methods described herein—is suited. A typical combination of hardware and software could be a general-purpose computer system with a computer program that, when loaded and executed, carries out methods described herein. Alternatively, a specific use computer, containing specialized hardware for carrying out one or more of the functional tasks of the invention, could be utilized.

The present invention or aspects of the invention can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

What is claimed is:

1. An apparatus for monitoring processing of coherence event signals in a multiprocessor system, said multiprocessor system having a plurality of processors, each processor having a dedicated memory storage device, said processors generating coherence events broadcast to other processors, each said processor having an associated coherence protocol unit comprising:

a plurality of multiple coherence ports for receiving said coherence event signals from each processor in said multiprocessor system;

a coherence traffic processing unit for processing said coherence event signals and forwarding said processed coherence event signals to said processor to which said coherence protocol unit is attached;

a coherence port unit for receiving and transmitting said forwarded coherence event signals from said coherence traffic processing unit to said processor;

one or more mode registers programmed to receive one or more bit values that, when set, initiate performing a single-step operation in said multiprocessor system; and one or more single-step registers programmed to receive one or more bit values that, when set, initiate processing of a single coherence event signal in a single-step operation mode, wherein said coherence port unit further comprises:

a state machine coupled to said one or more mode registers and said one or more single-step registers for determining the status of said one or more mode registers and said one or more single-step registers; and, a data path coupled to said coherence traffic processing unit and said processor, wherein said coherence event signals are processed by said data path under control of said state machine.

2. The apparatus in claim 1, wherein said determining the status of said one or more mode registers comprises determining responsive to presence of a first predetermined one of said one or more bit values is present in one or more mode registers; and which of said one or more bit values is encountered whether said state machine operates in a normal execution mode or a single-step mode.

3. The apparatus in claim 2, wherein said determining the status of said one or more single-step registers comprises determining responsive to presence of a second predetermined one of said one or more bit values is present in one or more single-step registers; and which of said one or more bit values is encountered whether said state machine processes a single coherence event signal to allow monitoring of said single coherence event signal.

4. The apparatus in claim 1, wherein a single register is provided and said single register is configured for determining a value of said one or more bit values to determine whether or not to stall said coherence port to processor unit to process said single coherence event signal to allow monitoring of said single coherence event signal.

5. The apparatus in claim 1, wherein said coherence protocol unit further comprises a snoop filter coupled to said coherence traffic processing unit and said coherence port to processor unit for reducing the number of coherence event signals presented to the processor.

6. The apparatus in claim 1, wherein said coherence protocol unit is coupled to a plurality of other coherence protocol units in the multiprocessor system by a single or a multiple ring interconnect or a switch is coupled to each said coherence protocol unit in said multiprocessor system.

7. The apparatus in claim 1, wherein said mode registers and said single-step registers are programmed by said associated processor, by another processor or an external service node in said multiprocessor system.

8. A method for monitoring the processing of coherence event signals in a multiprocessor system, said multiprocessor system having a plurality of processors, each processor having a dedicated memory storage device, said processors generating coherence events broadcast to other processors, each said processor having an associated coherence protocol unit, said method comprising:
receiving said coherence event signals from each processor in said multiprocessor system at a plurality of multiple coherence ports;
processing said received coherence event signals at a coherence traffic processing unit and forwarding said processed coherence event signals to said processor;
receiving said forwarded coherence event signals at a coherence port unit and transmitting said coherence event signals to said processor;
providing one or more programmed mode registers for receiving one or more bit values that, when set, initiate performing a single-step operation in said multiprocessor system; and providing one or more programmed single-step registers for receiving one or more bit values that, when set, initiate processing of a single coherence event signal in a single-step operation mode, wherein receiving said forwarded coherence event signals at a coherence port to processor unit further comprises:
determining the status of said one or more mode registers and said one or more single-step registers by providing a state machine coupled to said one or more mode registers and said one or more single-step registers, wherein a data path couples said coherence traffic processing unit and said processor, and wherein said data path provides flow control of said coherence event signals; and
controlling said flow of coherence event signals by gating said data path under the control of said state machine.

9. The method for monitoring the processing of coherence event signals in a multiprocessor system in claim 8, wherein said determining the status of said one or more mode registers comprises determining responsive to
presence of a first predetermined one of said one or more bit values is present in one or more mode registers; and
which of said one or more bit values is encountered,
whether said state machine operates in a normal execution mode or a single-step mode.

10. The method for monitoring the processing of coherence event signals in a multiprocessor system in claim 9, wherein determining the status of said one or more single-step registers comprises determining responsive to:
presence of a first predetermined one of said one or more bit values is present in one or more single-step registers; and
which of said one or more bit values is encountered,
whether said state machine processes a single coherence event signal to allow monitoring of said single coherence event signal.

11. The method for monitoring the processing of coherence event signals in a multiprocessor system in claim 8, wherein a single register is provided and said single register is configured for determining a value of said one or more bit values to determine whether or not to stall said coherence port to processor unit to process said single coherence event signal to allow monitoring of said single coherence event signal.

12. The method for monitoring the processing of coherence event signals in a multiprocessor system in claim 8, further comprising:
filtering said processed coherence event request signals processed by said coherence traffic processing unit for reducing the number of coherence event signals presented to the processor.

13. The method for monitoring the processing of coherence event signals in a multiprocessor system in claim 8, further comprising:
programming said mode registers by said associated processor, by another processor or an external service node in said multiprocessor system.

14. A computer program storage device, readable by machine, tangibly embodying a program of instructions executable by a machine for performing a method for monitoring processing of coherence event signals in a multiprocessor system, said multiprocessor system having a plurality of processors, each processor having a dedicated memory storage device, said processors generating coherence events broadcast to other processors, each said processor having an associated coherence protocol unit, said method comprising:
receiving said coherence event signals from each processor in said multiprocessor system at a plurality of multiple coherence ports;
processing said received coherence event signals at a coherence traffic processing unit and forwarding said processed coherence event signals to said processor;
receiving said forwarded coherence event signals at a coherence port unit and transmitting said coherence event signals to said processor;
providing one or more programmed mode registers for receiving one or more bit values that, when set, initiate performing a single-step operation in said multiprocessor system; and
providing one or more programmed single-step registers for receiving one or more bit values that, when set, initiate processing of a single coherence event signal in a single-step operation mode,
wherein receiving said forwarded coherence event signals at a coherence port to processor unit further comprises:
determining the status of said one or more mode registers and said one or more single-step registers by providing a state machine coupled to said one or more mode registers and said one or more single-step registers, wherein a data path couples said coherence traffic processing unit and said processor, and wherein said data path provides flow control of said coherence event signals; and
controlling said flow of coherence event signals by gating said data path under the control of said state machine.

15. The apparatus of claim 1, wherein the coherence protocol unit is distinct from any cache memory units.

16. The method of claim 8, wherein the coherence event ports are distinct from any ports that transmit instructions and/or data.

17. A multiprocessor system comprising:
a plurality of respective parallel communication paths, each communication path comprising:
at least one respective processor;
at least one respective cache unit, each respective cache unit being associated with the respective processor in the communication path;
means for coupling to a main memory; and
a plurality of respective coherence protocol units, each respective coherence protocol unit operating in parallel with an associated one of the respective parallel communication paths and being distinct from the respective cache unit associated with the processor in the respective communication path, each coherence protocol unit comprising:

at least one respective coherence port for communicating coherence signals with other coherence protocol units;

one or more mode registers programmed to receive one or more bit values that, when set, initiate performing a single-step operation in said multiprocessor system;

one or more single-step registers programmed to receive one or more bit values that, when set, initiate processing of a single coherence event signal in a single-step operation mode;

at least one respective coherence processor for processing coherence signals received at the respective coherence port to selectively discern coherence events, responsive to a selected one of normal and single step modes; and means for communicating coherence events to the respective processor in the respective communication path, responsive to the selected one of the normal and single step modes, wherein said coherence port unit further comprises:

a state machine coupled to said one or more mode registers and said one or more single-step registers for determining a status of respective said one or more mode registers and said one or more single-step registers; and, a data path coupled to said coherence processor and said processor, wherein said coherence event signals are processed by said data path under control of said state machine.

\* \* \* \* \*